United States Patent
Lai et al.

(10) Patent No.: US 11,697,594 B2
(45) Date of Patent: Jul. 11, 2023

(54) METHOD FOR RECYCLING SPENT CARBON CATHODE OF ALUMINUM ELECTROLYSIS

(71) Applicant: CENTRAL SOUTH UNIVERSITY, Changsha (CN)

(72) Inventors: Yanqing Lai, Changsha (CN); Zhongliang Tian, Changsha (CN); Kai Yang, Changsha (CN); Yifan Li, Changsha (CN); Peiyu Gong, Changsha (CN); Bo Hong, Changsha (CN); Jie Li, Changsha (CN)

(73) Assignee: CENTRAL SOUTH UNIVERSITY, Changsha (CN)

( * ) Notice: Subject to any disclaimer, the term of this patent is extended or adjusted under 35 U.S.C. 154(b) by 0 days.

(21) Appl. No.: 17/764,561

(22) PCT Filed: Jan. 16, 2021

(86) PCT No.: PCT/CN2021/072343
§ 371 (c)(1),
(2) Date: Mar. 29, 2022

(87) PCT Pub. No.: WO2021/143887
PCT Pub. Date: Jul. 22, 2021

(65) Prior Publication Data
US 2023/0120820 A1    Apr. 20, 2023

(30) Foreign Application Priority Data

Jan. 19, 2020 (CN) .......................... 202010059668.9
Jan. 19, 2020 (CN) .......................... 202010062001.4

(51) Int. Cl.
C01B 32/205    (2017.01)
C25C 3/08    (2006.01)
(Continued)

(52) U.S. Cl.
CPC .............. *C01B 32/205* (2017.08); *B09B 3/40* (2022.01); *B09B 3/70* (2022.01); *C25C 3/08* (2013.01); *B09B 2101/15* (2022.01)

(58) Field of Classification Search
CPC ........... C01B 32/215; C25C 3/08; B09B 3/40; B09B 3/70
See application file for complete search history.

(56) References Cited

U.S. PATENT DOCUMENTS 5,352,419 A * 10/1994 Jenkins ..................... C25C 3/08
423/489
5,955,042 A    9/1999 Barnett et al.

FOREIGN PATENT DOCUMENTS

CN    1320491 A    11/2001
CN    1785537 A    6/2006
(Continued)

OTHER PUBLICATIONS

Yang, Kai, et al. "Recycling spent carbon cathode by a roasting method and its application in Li-ion batteries anodes." Journal of Cleaner Production 261 (2020): 121090.*
(Continued)

*Primary Examiner* — Richard M Rump
(74) *Attorney, Agent, or Firm* — Bayramoglu Law Offices LLC

(57) ABSTRACT

A method for recycling spent carbon cathode of aluminum electrolysis includes the following steps: (1) crushing and sieving spent carbon cathode, to obtain carbon particles; (2) mixing the carbon particles with a sulfuric acid solution, to obtain a slurry A, and then performing pressure leaching, to obtain a slurry B; (3) evaporating and concentrating the slurry B until a mass percentage of water is lower than 8%, to obtain a slurry C; (4) adding concentrated sulfuric acid to the slurry C to obtain a slurry D, then roasting the slurry D at 150-300° C. for 0.5-10 h, and then roasting at 300-600°
(Continued)

C. for 0.5-8 h, to obtain the roasted carbon; and calcining the roasted carbon at a high temperature, to obtain the purified carbon, or mixing the roasted carbon with a leaching agent, and performing leaching, filtering, and washing, to obtain the purified carbon.

20 Claims, 2 Drawing Sheets

(51) Int. Cl.
  *B09B 3/70* (2022.01)
  *B09B 3/40* (2022.01)
  *B09B 101/15* (2022.01)

(56) References Cited

FOREIGN PATENT DOCUMENTS

| | | |
|---|---|---|
| CN | 104787788 A | 7/2015 |
| CN | 106180118 A | 12/2016 |
| CN | 108728867 A | 11/2018 |
| CN | 110127649 A | 8/2019 |
| CN | 111170299 A | 5/2020 |
| CN | 111232947 A | 6/2020 |
| GB | 2056422 A | 3/1981 |
| JP | 2006024482 A | 1/2006 |
| KR | 2195865 B1 * | 12/2020 ........... C01B 32/215 |

OTHER PUBLICATIONS

Indurkar, Pankaj D. Optimization in the treatment of spent pot lining—a hazardous waste made safe. Diss. 2014.*

Li Yuhong, et al., Resource Treatment of Electrolytic Aluminum Cathode Block Waste, Multipurpose Utilization of Mineral Resources, 2018, pp. 126-129.

Xiaotu Ma, et al., High-Performance Graphite Recovered from Spent Lithium-Ion Batteries, ACS Sustainable Chemistry & Engineering, 2019, pp. 19732-19738, vol. 7.

* cited by examiner

METHOD FOR RECYCLING SPENT CARBON CATHODE OF ALUMINUM ELECTROLYSIS

CROSS REFERENCE TO THE RELATED APPLICATIONS

This application is the national phase entry of International Application No. PCT/CN2021/072343, filed on Jan. 16, 2021, which is based upon and claims priority to Chinese Patent Application No. 202010059668.9, filed on Jan. 19, 2020, and Chinese Patent Application No. 202010062001.4, filed on Jan. 19, 2020, the entire contents of which are incorporated herein by reference.

TECHNICAL FIELD

The present invention relates to the field of comprehensive utilization technologies of solid waste in the electrolytic aluminum industry, and specifically, to the recycling of spent carbon cathode resources of aluminum electrolysis.

BACKGROUND

The carbon cathode of aluminum reduction cell deforms, bulges and breaks due to the effect (e.g., erosion and scour) of molten salt and aluminum liquid and the existence of thermal stress, resulting in the generation of the spent carbon cathode. Generally, every 1 ton of electrolytic aluminum is produced with the emission of approximately 10 kg of spent carbon cathode. In 2018, 64.34 million tons of electrolytic aluminum were produced all over the world, and more than 0.6 million tons of spent carbon cathode were generated, being enormous amounts. The spent carbon cathode of aluminum electrolysis include carbon, aluminum fluoride, sodium fluoride, calcium fluoride, cryolite, aluminum oxide, nepheline, cyanide and other substances. Among them, carbon accounts for 50% to 70% and is highly graphitized, and the remaining fluorides are the essential components of the electrolyte and are all renewable resources. Separation and recycling of the spent carbon cathode are conducive to the sustainable development of the electrolytic aluminum industry and can achieve good economic benefits.

Currently, recycling methods for spent carbon cathode from the aluminum reduction cell can be summarized into two recycling processes: a pyrometallurgical method with high-temperature roasting is the core and a hydrometallurgical method which is mainly flotation and leaching. In the pyrometallurgical method, the graphitized carbon materials with a high calorific value in the spent carbon cathode are used as a fuel and burned, to recycle the electrolyte and eliminate the harm caused by fluoride and cyanide. However, a large amount of fluoride in the spent carbon cathode volatilizes under high temperature conditions (>1000° C.), which causes serious corrosion to subsequent flue gas treatment equipment. In addition, the highly graphitized carbon materials are burned directly, which causes a waste of resources. The hydrometallurgical method can realize recycling of both the graphitized carbon materials and the fluorine-containing compounds and comprehensive utilization of the spent carbon cathode. However, a large amount of fluorine-containing waste water is generated in the process of the hydrometallurgical method, which is difficult to treat.

To resolve the problem of high-temperature fluorine-containing flue gas and fluorine-containing waste water, a series of spent carbon cathode treatment processes based on sulfating roasting is provided. In the patent CN110127649A, the spent carbon cathode are treated by oxidative decyanation, sulfating roasting defluorination, and concentrated crystallization to obtain mirabilite. However, the method needs to consume concentrated sulfuric acid equivalent to 5-7 times the mass of the spent carbon cathode and sodium hydroxide equivalent to 2-3 times the mass of the spent carbon cathode, and generates waste water more than 15 times the mass of the spent carbon cathode in the treatment process. In the patent CN1320491A, the spent carbon cathode are treated by acid and alkali combined roasting. However, as for the obtained products, sodium sulfate contains fluorine, aluminum oxide contains silicon, and fluoride contains iron, so the quality is difficult to guarantee. In the patents GB2056422A and US005955042A, the high-temperature treatment is performed on the spent carbon cathode after sulfating roasting. In the process, the graphitized carbon materials are used as a fuel for low-value combustion, which is a waste of resources. It can be seen that the conventional sulfating roasting processes also have the problem of a large amount of waste water and difficult recycling of carbonaceous materials.

SUMMARY

In view of the shortcomings of the foregoing methods, an objective of the present invention is to provide a method for recycling spent carbon cathode of aluminum electrolysis. In the method, high-temperature fluorine-containing flue gas and waste water are not produced in the treatment process. In addition, fluorine can be recycled and returned to the aluminum electrolysis system, and carbonaceous materials of high purity can be obtained, thereby realizing comprehensive recycling and cleaning treating of the spent carbon cathode of aluminum electrolysis.

To achieve the foregoing technical objective, the present invention adopts the following technical solution 1:

A method for recycling spent carbon cathode of aluminum electrolysis includes the following steps:

mixing spent carbon cathode particles with a sulfuric acid solution to obtain a slurry A, and performing leaching to obtain a slurry B, where the concentration of the sulfuric acid solution is 0.5-8 mol/L; evaporating and concentrating the slurry B to obtain a slurry C; adding concentrated sulfuric acid to the slurry C to obtain a slurry D, performing first-stage roasting on the slurry D at 150-300° C., and then performing second-stage roasting at 300-600° C. to obtain the roasted carbon; and calcining the roasted carbon to obtain the purified carbon.

In the technical solution 1 of the present invention, the concentrated sulfuric acid is an aqueous solution of $H_2SO_4$ in which a mass percentage of $H_2SO_4$ is greater than or equal to 70% as defined in the existing technology.

In a preferred solution, the spent carbon cathode particles are obtained by crushing and sieving the spent carbon cathode.

In a preferred solution, the concentration of the sulfuric acid solution is 1-3 mol/L.

In a preferred solution, in the slurry A, by mole ratio, Si:S=1:(2.05-3.0).

Further preferably, in the slurry A, by mole ratio, Si:S=1:(2.1-3.0).

Still further preferably, in the slurry A, by mole ratio, Si:S=1:(2.10-2.25).

In a preferred solution, the leaching is pressure leaching.

In a preferred solution, the leaching temperature is 100-300° C., the leaching time is 1-10 h, and the pressure is 0.1-9 MPa.

Further preferably, the leaching temperature is 150-250° C., the leaching time is 2-5 h, and the pressure is 0.4-4 MPa. In the leaching process, the alkaline solution is used to absorb a gas.

In the technical solution 1 of the present invention, during the leaching, the sulfuric acid solution is correspondingly added with Si element in the carbon particles as a target. In the process, under acidic conditions, the soluble sodium fluoride reacts with silicon dioxide or silicate as follows:

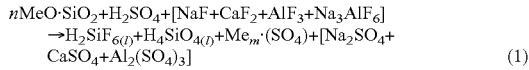

$$n\text{MeO·SiO}_2 + \text{H}_2\text{SO}_4 + [\text{NaF} + \text{CaF}_2 + \text{AlF}_3 + \text{Na}_3\text{AlF}_6] \rightarrow \text{H}_2\text{SiF}_{6(l)} + \text{H}_4\text{SiO}_{4(l)} + \text{Me}_{m'}(\text{SO}_4) + [\text{Na}_2\text{SO}_4 + \text{CaSO}_4 + \text{Al}_2(\text{SO}_4)_3] \quad (1)$$

The reaction converts the solid aluminosilicate and silicon dioxide that are difficult to treat into the liquid silicofluoric acid and colloidal orthosilicic acid. Silicofluoric acid is volatile, and colloidal orthosilicic acid has a large specific surface area and high chemical activity and is easier to remove in the next two stages of roasting. However, when being mixed, sulfuric acid with a high concentration quickly reacts with the spent carbon cathode as follows:

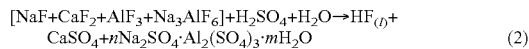

$$[\text{NaF} + \text{CaF}_2 + \text{AlF}_3 + \text{Na}_3\text{AlF}_6] + \text{H}_2\text{SO}_4 + \text{H}_2\text{O} \rightarrow \text{HF}_{(l)} + \text{CaSO}_4 + n\text{Na}_2\text{SO}_4 \cdot \text{Al}_2(\text{SO}_4)_3 \cdot m\text{H}_2\text{O} \quad (2)$$

In this case, the spent carbon cathode is severely agglomerated, affecting the leaching effect and affecting carbon purity. Therefore, a concentration of leaching acid should not be excessively high.

In a preferred solution, the slurry B is evaporated and concentrated at 100-200° C., and preferably at 120-180° C., to obtain the slurry C. Steam generated in the process of evaporating and concentrating the slurry B is recycled.

The reason for evaporating and concentrating the slurry B is that if the concentrated sulfuric acid is directly added to the slurry B without concentration, the slurry volatilizes severely at the first-stage roasting temperature due to the existence of excessive water. The volatilized water vapor takes away the sulfuric acid and causes acid loss to affect fluorine removal and increases the corrosivity of flue gas to corrode equipment.

In a preferred solution, in the slurry C, a mass fraction of water is <8%.

In a preferred solution, the concentration of the concentrated sulfuric acid is 17-18.4 mol/L.

In a preferred solution, in the slurry D, by mole ratio, F:S=1:(0.5-5).

Further preferably, in the slurry D, by note ratio, F:S=1:(1-4.5).

In a preferred solution, the first-stage roasting temperature is 150-250° C., and the first-stage roasting time is 0.5-10 h, preferably, 1-5 h.

During the actual operation, fluorine in flue gas generated in the first-stage roasting is absorbed and recycled by aluminum oxide using a dry process.

In the technical solution 1 of the present invention, an objective of the first-stage roasting is to remove fluorine and silicon in the spent carbon cathode, thereby preventing the considerable volatilization of fluoride that corrodes the equipment in the stage of high-temperature calcination and helping to improve carbon purity. Reactions occurring in the process of the first-stage roasting are as follows:

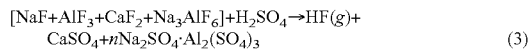

$$[\text{NaF} + \text{AlF}_3 + \text{CaF}_2 + \text{Na}_3\text{AlF}_6] + \text{H}_2\text{SO}_4 \rightarrow \text{HF}(g) + \text{CaSO}_4 + n\text{Na}_2\text{SO}_4 \cdot \text{Al}_2(\text{SO}_4)_3 \quad (3)$$

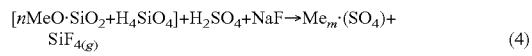

$$[n\text{MeO·SiO}_2 + \text{H}_4\text{SiO}_4] + \text{H}_2\text{SO}_4 + \text{NaF} \rightarrow \text{Me}_{m'}(\text{SO}_4) + \text{SiF}_{4(g)} \quad (4)$$

$$\text{H}_2\text{SiF}_{6(l)} \rightarrow \text{H}_2\text{SiF}_{6(g)} \quad (5)$$

In a preferred solution, the second-stage roasting temperature is 350-500° C., and the second-stage roasting time is 0.5-8 h, preferably, 1-3 h.

In the technical solution 1 of the present invention, an objective of the second-stage roasting is to remove the redundant sulfuric acid in the spent carbon cathode to prevent the decomposing and volatilizing of the sulfuric acid in the stage of high-temperature roasting to generate high-temperature sulfur-containing flue gas that corrodes the equipment. Reactions occurring in the process of the second-stage roasting are as follows:

$$\text{H}_2\text{SO}_{4(l)} \rightarrow \text{H}_2\text{O}_{(g)} + \text{SO}_{3(g)} \quad (6)$$

$$\text{H}_2\text{SO}_{4(l)} \rightarrow \text{H}_2\text{SO}_{4(g)} \quad (7)$$

In a preferred solution, flue gas generated in the second-stage roasting is absorbed using the steam recycled in the process of evaporating and concentrating the slurry B, and an acid solution formed after absorption is used to prepare a sulfuric acid solution to be returned for the leaching of the spent carbon cathode particles. The foregoing operations realize the reuse of the sulfuric acid solution and avoid the discharge of waste water.

In a preferred solution, the calcination temperature is 1200-3000° C., and the calcination time is 0.5-20 h.

Further preferably, the roasted carbon is calcined at 1200-2200° C., preferably, 1400-2200° C., for 4-10 h, to obtain a carbon material. The purity of the obtained carbon material is greater than 97.5%.

Further preferably, the roasted carbon is calcined at 2200-3000° C., preferably, 2200-2600° C., for 4-7 h, to obtain a graphite powder. The purity of the obtained graphite powder is greater than 99%.

Flue gas generated in the calcination process is absorbed and treated using the alkaline solution.

An objective of the high-temperature calcination is to volatilize and remove the sulfate generated in the process of two stages of roasting and perform recycling. Reactions occurring in the process are as follows:

$$\text{Me}_{m'}(\text{SO}_4) + \text{C} \rightarrow \text{Me}_n\text{S}_{(g)} + \text{CO}_{(g)} \quad (8)$$

$$\text{Na}_2(\text{SO}_4)_{(s)} \rightarrow \text{Na}_2(\text{SO}_4)_{(g)} \quad (9)$$

In a preferred solution, the calcination is performed in an inert atmosphere, a reducing atmosphere, or an atmosphere with an oxygen partial pressure less than 1000 Pa.

The inert atmosphere is provided by at least one selected from the group consisting of helium, nitrogen, and argon, and the reducing atmosphere is provided by any one selected from the group consisting of hydrogen, carbon monoxide, methane, ethane, and propane.

In the technical solution 1 of the present invention, the acid leaching is used to convert the solid silicon dioxide and silicate that are difficult to react into the easy-to-react liquid silicofluoric acid and colloidal orthosilicic acid, low-temperature roasting is used to recycle fluorine in a gaseous form, and high-temperature calcination is used to obtain the purified carbon. In the process, the steam generated during concentration is used to absorb sulfur dioxide to make acid and return to acid leaching, which realizes the circulation of water and sulfur. In the entire procedure, the high-temperature fluorine-containing flue gas and waste water are not produced, and the comprehensive recycling of fluorine and carbon materials and cleaning treating of spent carbon cathode are realized.

A technical solution 2 adopted by the present invention is as follows:

A method for recycling spent carbon cathode of aluminum electrolysis includes the following steps:

mixing spent carbon cathode particles with a sulfuric acid solution to obtain a slurry A, and performing first leaching to obtain a slurry B, where the concentration of the sulfuric acid solution is 0.5-8 mol/L; evaporating and concentrating the slurry B to obtain a slurry C; adding concentrated sulfuric acid to the slurry C to obtain a slurry D; performing first-stage roasting on the slurry D at 150-300° C., and then performing second-stage roasting at 300-600° C. to obtain the roasted carbon; mixing the roasted carbon with a leaching agent to perform second leaching, where the leaching agent was water or a mixed solution of water and a pH regulator M; adding a pH regulator N in the process to control a pH value of a slurry E obtained at the end of the second leaching to be less than 6 or greater than 8; and performing solid-liquid separation, where the obtained solid phase is dried to obtain a carbon material.

In the technical solution 2 of the present invention, the concentrated sulfuric acid is an aqueous solution of $H_2SO_4$ in which a mass percentage of $H_2SO_4$ is greater than or equal to 70% as defined in the existing technology.

In a preferred solution, the spent carbon cathode particles are obtained by crushing and sieving the spent carbon cathode.

In a preferred solution, the concentration of the sulfuric acid solution is 1-3 mol/L.

In a preferred solution, in the slurry A, by mole ratio, Si:S=1:(2.05-3.0).

Further preferably, in the slurry A, by mole ratio, Si:S=1:(2.05-2.3).

Still further preferably, in the slurry A, by mole ratio, Si:S=1:(2.10-2.25).

In a preferred solution, the first leaching is pressure leaching.

In a preferred solution, the first leaching temperature is 100-300° C., the first leaching time is 1-10 h, and the pressure is 0.1-9 MPa.

Further preferably, the first leaching temperature is 150-250° C., the first leaching time is 2-5 h, and the pressure is 0.4-4 MPa. In the leaching process, the alkaline solution is used to absorb a gas.

In the present invention, during the first leaching, the sulfuric acid solution is correspondingly added with Si element in the carbon particles as a target. In the process, under acidic conditions, the soluble sodium fluoride reacts with silicon dioxide or silicate as follows:

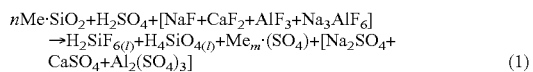

$$nMe\cdot SiO_2+H_2SO_4+[NaF+CaF_2+AlF_3+Na_3AlF_6] \rightarrow H_2SiF_{6(l)}+H_4SiO_{4(l)}+Me_m\cdot(SO_4)+[Na_2SO_4+CaSO_4+Al_2(SO_4)_3] \quad (1)$$

The reaction converts the solid aluminosilicate and silicon dioxide that are difficult to treat into the liquid silicofluoric acid and colloidal orthosilicic acid. Silicofluoric acid is volatile, and colloidal orthosilicic acid has a large specific surface area and high chemical activity and is easier to remove in the next two stages of roasting. However, when being mixed, sulfuric acid with a high concentration quickly reacts with the spent carbon cathode as follows:

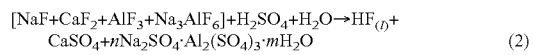

$$[NaF+CaF_2+AlF_3+Na_3AlF_6]+H_2SO_4+H_2O \rightarrow HF_{(l)}+CaSO_4+nNa_2SO_4\cdot Al_2(SO_4)_3\cdot mH_2O \quad (2)$$

In this case, the spent carbon cathode is severely agglomerated, affecting the leaching effect and affecting carbon purity. Therefore, the concentration of leaching acid should not be excessively high.

In a preferred solution, the slurry B is evaporated and concentrated at 100-200° C., and preferably at 120-180° C., to obtain the slurry C. Steam generated in the process of evaporating and concentrating the slurry B is recycled.

The reason for evaporating and concentrating the slurry B is that if the concentrated sulfuric acid is directly added to the slurry B without concentration, the slurry volatilizes severely at first-stage roasting temperature due to the existence of the excessive water. The volatilized water vapor takes away the sulfuric acid and causes acid loss to affect fluorine removal and increases the corrosivity of flue gas to corrode equipment.

In a preferred solution, in the slurry C, a mass fraction of water is <8%.

In a preferred solution, the concentration of the concentrated sulfuric acid is 17-18.4 mol/L. The concentration refers to a molarity of $H_2SO_4$ in the concentrated sulfuric acid.

In a preferred solution, in the slurry D, by mole ratio, F:S=1:(0.5-5).

Further preferably, in the slurry D, by mole ratio, F:S=1:(1-4.5).

In a preferred solution, the first-stage roasting temperature is 150-250° C., and the first-stage roasting time is 0.5-10 h, preferably, 1-5 h.

During the actual operation, fluorine in flue gas generated in the first-stage roasting is absorbed and recycled by aluminum oxide using a dry process.

In the technical solution 2 of the present invention, an objective of the first-stage roasting is to remove fluorine and silicon in the spent carbon cathode, thereby preventing the considerable volatilization of fluoride that corrodes the equipment in the stage of high-temperature calcination and helping to improve carbon purity. Reactions occurring in the process of the first-stage roasting are as follows:

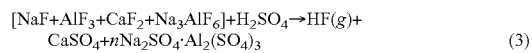

$$[NaF+AlF_3+CaF_2+Na_3AlF_6]+H_2SO_4 \rightarrow HF(g)+CaSO_4+nNa_2SO_4\cdot Al_2(SO_4)_3 \quad (3)$$

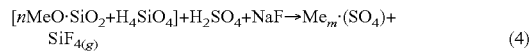

$$[nMeO\cdot SiO_2+H_4SiO_4]+H_2SO_4+NaF \rightarrow Me_m\cdot(SO_4)+SiF_{4(g)} \quad (4)$$

$$H_2SiF_{6(l)} \rightarrow H_2SiF_{6(g)} \quad (5)$$

In a preferred solution, the second-stage roasting temperature is 350-500° C., and the second-stage roasting time is 0.5-8 h, preferably, 1-3 h.

In the present invention, an objective of the second-stage roasting is to remove redundant sulfuric acid in the spent carbon cathode to prevent the decomposing and volatilizing of the sulfuric acid in the stage of high-temperature roasting to generate high-temperature sulfur-containing flue gas that corrodes the equipment. Reactions occurring in the process of the second-stage roasting are as follows:

$$H_2SO_{4(l)} \rightarrow H_2O_{(g)}+SO_{3(g)} \quad (6)$$

$$H_2SO_{4(l)} \rightarrow H_2SO_{4(g)} \quad (7)$$

In a preferred solution, flue gas generated in the second-stage roasting is absorbed using the steam recycled in the process of evaporating and concentrating the slurry B, and an acid solution formed after absorption is used to prepare a sulfuric acid solution to be returned for the leaching of the spent carbon cathode particles. The foregoing operations realize the reuse of the sulfuric acid solution and avoid the discharge of waste water.

In a preferred solution, a solid-liquid mass volume ratio of the roasted carbon to the leaching agent was 1 g:(0.5-10) mL, preferably, 1 g:(1-3) mL.

In a preferred solution, the second leaching temperature is 10-300° C., and the second leaching time is 0.5-10 h.

Further preferably, the second leaching temperature is 25-100° C., and the second leaching time is 1-3 h.

In a preferred solution, the pH regulator M and the pH regulator N are both at least one selected from the group consisting of sulfuric acid, hydrochloric acid, nitric acid, sodium hydroxide, potassium hydroxide, sodium carbonate, potassium carbonate, sodium bicarbonate, and potassium bicarbonate.

In a preferred solution, the pH value of the obtained slurry F is less than 5 or greater than 9.

In a preferred solution, the obtained slurry E is filtered and washed to obtain a neutral filter cake and a filtrate, the neutral filter cake was dried to obtain the carbon material, and the filtrate was used as a raw material for recycling aluminum, sodium, and sulfate.

In the present invention, an objective of the second leaching is to dissolve the soluble sulfates generated in the process of the two stages of roasting such as $nNa_2SO_4 \cdot Al_2(SO_4)_3$, $Na_2SO_4$, and $Al_2(SO_4)_3$ in a solution, realizing solid-liquid separation and carbon material purification by filtering and washing, where a generated filtrate is used for recycling aluminum, sodium, and sulfate; and control the pH value of the slurry E to be less than 6 or greater than 8, because if the pH value is not within the range, the following reaction occurs:

$$Al^{3+}+OH^- \rightarrow Al(OH)_3\downarrow \quad (8)$$

Aluminum hydroxide generated in the reaction deposits and is mixed with carbon, which reduces carbon purity and restricts recycling of aluminum.

In the technical solution 2 of the present invention, the acid leaching is used to convert the solid silicon dioxide and silicate that are difficult to react into the easy-to-react liquid silicofluoric acid and colloidal orthosilicic acid, low-temperature roasting is used to recycle fluorine in a gaseous form, and leaching and purification are used to obtain the purified carbon. In the process, the steam generated during concentration is used to absorb sulfur dioxide to make acid and return to acid leaching, which realizes the circulation of water and sulfur. In the entire procedure, high-temperature fluorine-containing flue gas and fluorine-containing waste water are not produced, and comprehensive recycling of fluorine and carbon materials and cleaning treating of spent carbon cathode are realized.

Advantages of the present invention are as follows:

1. In the present invention, sulfuric acid is used to interact with non-carbon components in spent carbon cathode to generate low-temperature fluorine-containing flue gas, which can resolve the problem of equipment corrosion caused by the high-temperature fluoride in a conventional pyrometallurgical method. In the process, the highest treatment temperature is not greater than 600° C., which can avoid the problems of high energy consumption and high requirements on equipment of the conventional pyrometallurgical processes. In the process, fluorine is volatilized and absorbed in a gaseous form, which can resolve the problems of fluorine-containing waste water and secondary pollution existing in hydrometallurgical method treatment.

2. In the present invention, steam generated during concentration is used to absorb sulfur dioxide gas to make acid and return to leaching, which realizes the reuse of water and sulfur. In the process, waste water and waste residue are not produced, and cleaning treating of the spent carbon cathode is realized.

3. In the present invention, silicon dioxide and silicate that are difficult to remove in the spent carbon cathode are converted into the silicofluoric acid and orthosilicic acid that are easy to remove, which is benefited for the removal of silicon and deep purification of carbon materials.

4. In the present invention, fluorine and aluminum in the spent carbon cathode can be recycled, and carbon materials with a high purity can be obtained, which realizes effective utilization of the spent carbon cathode.

DETAILED DESCRIPTION OF THE EMBODIMENTS

Figure 1:
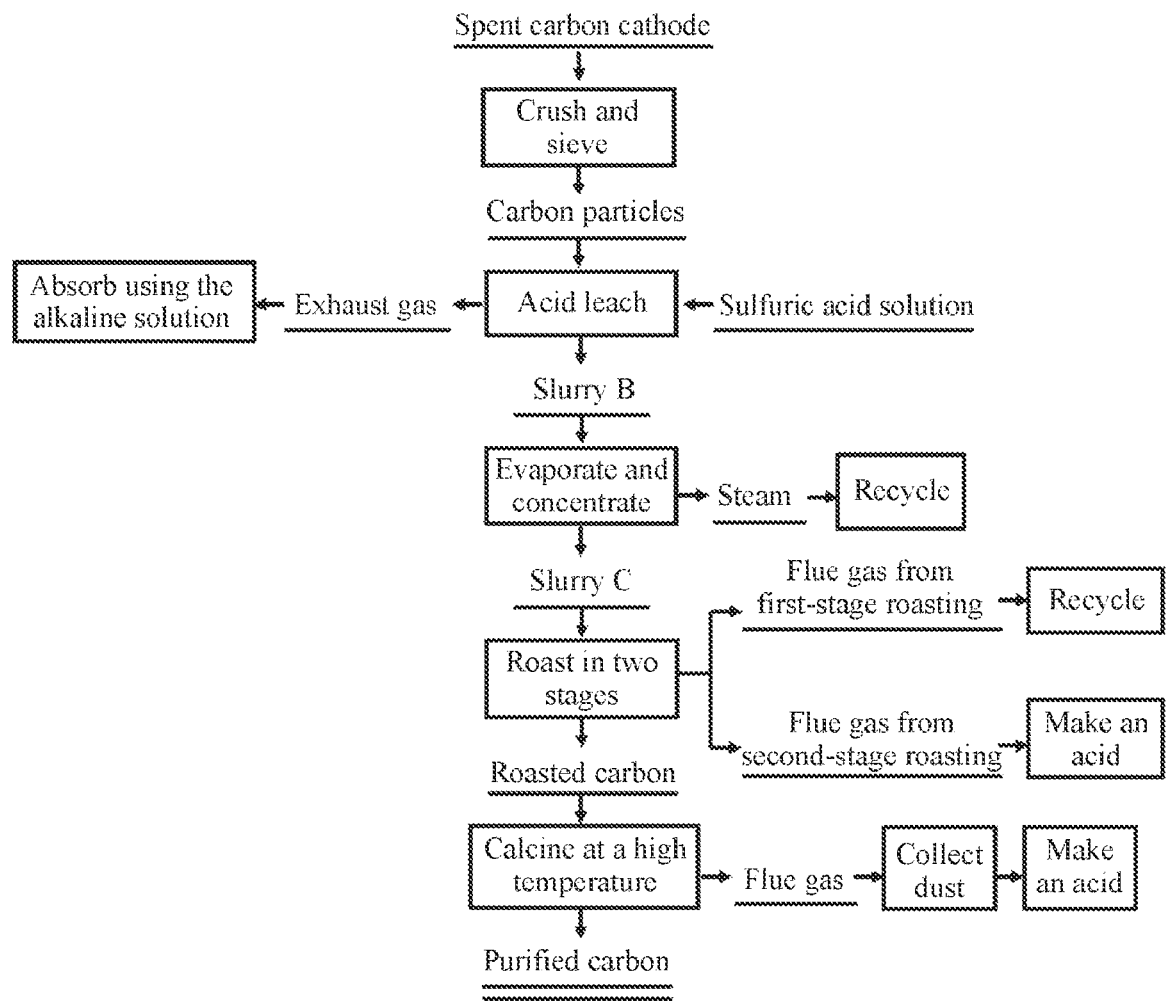
FIG. 1 is a process flowchart of a technical solution 1 of a method for recycling spent carbon cathode of aluminum electrolysis according to the present invention. A raw material is spent carbon cathode from an electrolytic aluminum plant after an overhaul, which can realize comprehensive recycling and cleaning treating of the spent carbon cathode after treatment.
Figure 2:
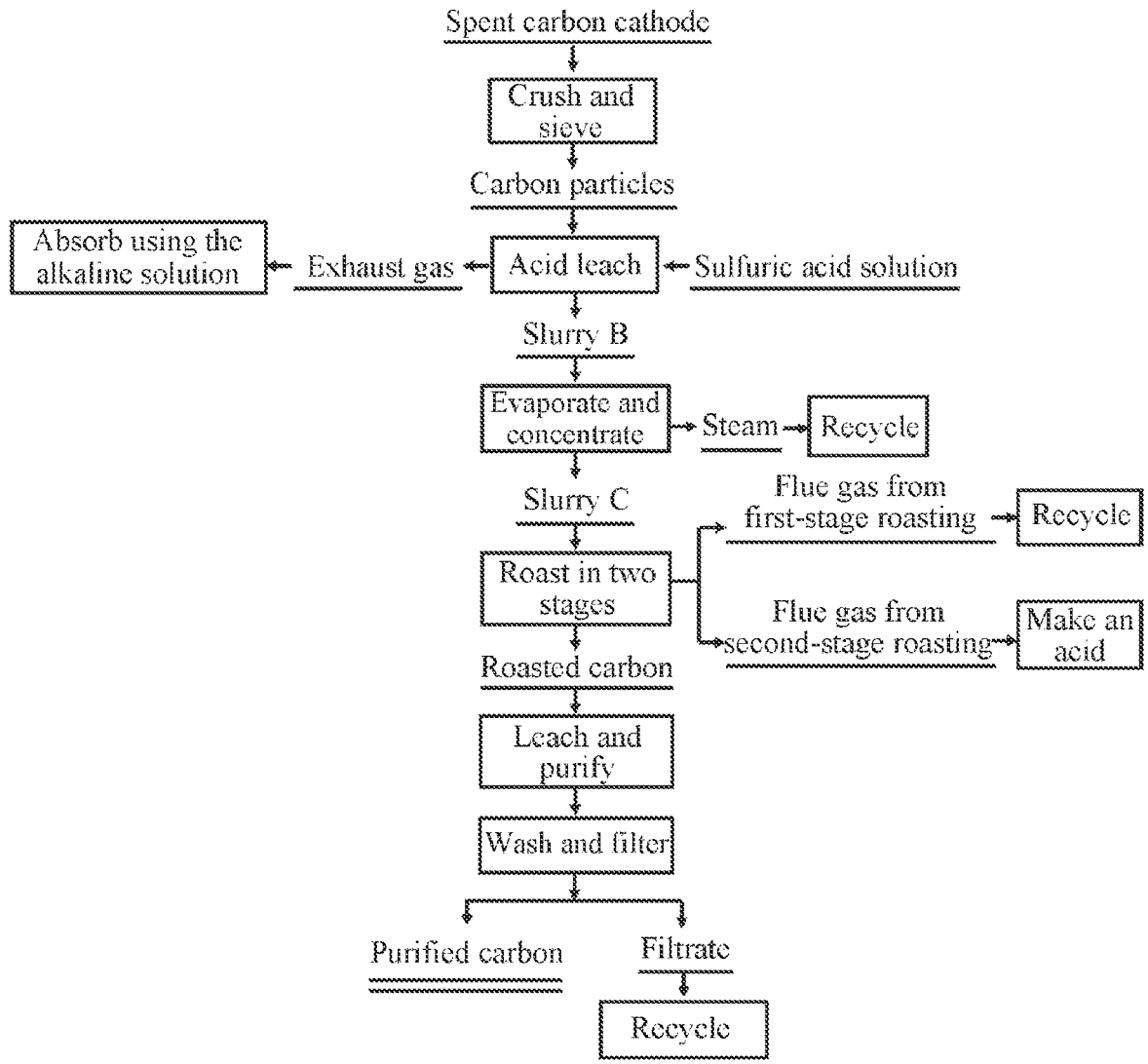
FIG. 2 is a process flowchart of a technical solution 2 of a method for recycling spent carbon cathode of aluminum electrolysis according to the present invention. A raw material is spent carbon cathode from an electrolytic aluminum plant after an overhaul, which can realize comprehensive recycling and cleaning treating of the spent carbon cathode after treatment.

The following examples are implemented according to the foregoing operation methods. Spent carbon cathode of aluminum electrolysis used in each example and comparative example have the same composition as follows: C: 70.91%, O: 3.81%, F: 10.1%, Na: 5.19%, Al: 3.49%, Si: 3.21%, S: 0.52%, Ca: 1.06%, Fe: 1.71%), and others: 0.78%.

Example 1

(1) Spent carbon cathode were crushed and sieved, to obtain carbon particles.

(2) A sulfuric acid solution was added with Si in the carbon particles and S in the sulfuric acid solution as targets to make a mole ratio of Si to S in a slurry A be 1:2.10, where a concentration of the sulfuric acid solution was 3 mol/L, an immersion time was 5 h, a temperature was 150° C., and the pressure was 0.4 MPa. A gas generated in the process was absorbed using the alkaline solution.

(3) A slurry B was evaporated and concentrated at 120° C., and generated steam was collected, to obtain a slurry C, where a mass percentage of water in the obtained slurry C was 8%.

(4) Concentrated sulfuric acid was added with F in the slurry C and S in the concentrated sulfuric acid and the slurry C as targets to make a mole ratio of F to S in a slurry D be 1:1.0, where a concentration of the concentrated sulfuric acid was 18.4 mol/L. Then, roasting was performed at 150° C. for 5 h, which was first-stage roasting. Fluorine in flue gas generated in the process is absorbed and recycled by aluminum oxide using a dry process. Then, roasting was performed at 350° C. for 3 h, which was second-stage roasting, to obtain the roasted carbon. Flue gas generated was recycled. In the process, a silicon removal rate was 98.84%, and a fluorine removal rate was 99.52%.

(5) The roasted carbon was kept insulated at 1400° C. for 10 h under a carbon monoxide atmosphere, to obtain a carbon material with a purity of 97.65%. Flue gas generated in the process was absorbed using a sodium hydroxide solution. Flue gas after dust collection treatment in step (4) and the flue gas generated by the second-stage roasting in step (4) were absorbed using the steam collected in step (3) to make acid, where the obtained acid was returned to step (2) for leaching.

Example 2

(1) Spent carbon cathode were crushed and sieved, to obtain carbon particles.

(2) A sulfuric acid solution was added with Si in the carbon particles and S in the sulfuric acid solution as targets to make a mole ratio of Si to S in a slurry A be 1:2.15, where a concentration of the sulfuric acid solution was 2 mol/L, an immersion time was 3 h, a temperature was 200° C., and the pressure was 1.6 MPa. A gas generated in the process was absorbed using the alkaline solution.

(3) A slurry B was evaporated and concentrated at 160° C., and generated steam was collected, to obtain a slurry C, where a mass percentage of water in the obtained slurry C was 7%.

(4) Concentrated sulfuric acid was added with F in the slurry C and S in the concentrated sulfuric acid and the slurry C as targets to make a mole ratio of to S in a slurry D be 1:2.0, where a concentration of the concentrated sulfuric acid was 18 mol/L. Then, roasting was performed at 200° C. for 3 h, which was first-stage roasting. Fluorine in flue gas generated in the process is absorbed and recycled by aluminum oxide using a dry process. Then, roasting was performed at 450° C. for 2 h, which was second-stage roasting, to obtain the roasted carbon. Flue gas generated was recycled. In the process, a silicon removal rate was 98.75%, and a fluorine removal rate was 99.50%.

(5) The roasted carbon was kept insulated at 2000° C. for 7 h under a hydrogen atmosphere, to obtain a carbon material with a purity of 98.74%. Flue gas generated in the process was absorbed using a potassium hydroxide solution. Flue gas after dust collection treatment in step (4) and the flue gas generated by the second-stage roasting in step (4) were absorbed using the steam collected in step (3) to make acid, where the obtained acid was returned to step (2) for leaching.

Example 3

(1) Spent carbon cathode were crushed and sieved, to obtain carbon particles.

(2) A sulfuric acid solution was added with Si in the carbon particles and S in the sulfuric acid solution as targets to make a mole ratio of Si to S in a slurry A be 1:2.20, where a concentration of the sulfuric acid solution was 1 mol/L, an immersion time was 1 h, a temperature was 250° C., and the pressure was 4 MPa. A gas generated in the process was absorbed using the alkaline solution.

(3) A slurry B was evaporated and concentrated at 180° C., and generated steam was collected, to obtain a slurry C, where a mass percentage of water in the obtained slurry C was 6%.

(4) Concentrated sulfuric acid was added with F in the slurry C and S in the concentrated sulfuric acid and the slurry C as targets to make a mole ratio of to S in a slurry D be 1:3.0, where a concentration of the concentrated sulfuric acid was 17 mol/L. Then, roasting was performed at 250° C. for 1 h, which was first-stage roasting. Fluorine in flue gas generated in the process is absorbed and recycled by aluminum oxide using a dry process. Then, roasting was performed at 500° C. for 1 h, which was second-stage roasting, to obtain the roasted carbon. Flue gas generated was recycled. In the process, a silicon removal rate was 98.89%, and a fluorine removal rate was 99.54%.

(5) The roasted carbon was kept insulated at 2600° C. for 4 h under an argon atmosphere, to obtain a graphite powder with a purity of 99.95%. Flue gas generated in the process was absorbed using a potassium hydroxide solution. Flue gas after dust collection treatment in step (4) and the flue gas generated by the second-stage roasting in step (4) were absorbed using the steam collected in step (3) to make acid, where the obtained acid was returned to step (2) for leaching.

Example 4

(1) Spent carbon cathode were crushed and sieved, to obtain carbon particles.

(2) A sulfuric acid solution was added with Si in the carbon particles and S in the sulfuric acid solution as targets to make a mole ratio of Si to S in a slurry A be 1:2.25, where a concentration of the sulfuric acid solution was 1 mol/L, an immersion time was 1.5 h, a temperature was 250° C., and the pressure was 4 MPa. A gas generated in the process was absorbed using the alkaline solution.

(3) A slurry B was evaporated and concentrated at 180° C., and generated steam was collected, to obtain a slurry C, where a mass percentage of water in the obtained slurry C was 5%.

(4) Concentrated sulfuric acid was added with F in the slurry C and S in the concentrated sulfuric acid and the slurry C as targets to make a mole ratio of F to S in a slurry D be 1:4.5, where a concentration of the concentrated sulfuric acid was 17 mol/L. Then, roasting was performed at 250° C. for 1 h, which was first-stage roasting. Fluorine in flue gas generated in the process is absorbed and recycled by aluminum oxide using a dry process. Then, roasting was performed at 500° C. for 1 h, which was second-stage roasting, to obtain the roasted carbon. Flue gas generated was recycled. In the process, a silicon removal rate was 99.01%, and a fluorine removal rate was 99.60%.

(5) The roasted carbon was kept insulated at 2300° C. for 6 h under an argon atmosphere, to obtain a graphite powder with a purity of 99.18%. Flue gas generated in the process was absorbed using a sodium hydroxide solution. Flue gas after dust collection treatment in step (4) and the flue gas generated by the second-stage roasting in step (4) were absorbed using the steam collected in step (3) to make acid, where the obtained acid was returned to step (2) for leaching.

Comparative Example 1

Compared with Example 1, the acid leaching in step (2) and the corresponding step of evaporation and concentration were omitted, concentrated sulfuric acid was directly added for roasting, and other conditions were kept unchanged; and after treatment of step (4), a silicon removal rate was 10.18%, a fluorine removal rate was 99.48%, and a purity of a finally obtained carbon was 93.75%. It can be seen that it is not beneficial to silicon removal and deep purification of carbon materials if phase transition was not performed on silicon dioxide and silicate in spent carbon cathode in advance.

Comparative Example 2

Compared with Example 1, the sulfuric acid solution was added in step (2) to make the mole ratio of Si to S in the slurry A be 1:1, and other conditions were kept unchanged; and after treatment of step (4), a silicon removal rate was 20.21%, a fluorine removal rate was 99.50%, and a purity of a finally obtained carbon was 94.84%; indicating that the addition of an excessively small amount of acid is not beneficial to silicon removal and as a result carbon purity, is affected.

Comparative Example 3

Compared with Example 1, the sulfuric acid solution was added in step (2) to make the mole ratio of Si to S in the slurry A be 1:5, and other conditions were kept unchanged; and after treatment of step (4), a silicon removal rate was 98.96%, a fluorine removal rate was 99.47%; and a purity of a finally obtained carbon was 97.62%. It can be seen that the addition of excessive acid cannot improve the carbon purity, but increases the burden on evaporation and concentration in step (3).

Comparative Example 4

Compared with Example 1, the concentration of acid used in step (2) was 10 mol/L, and other conditions were kept unchanged; and after treatment of step (4), a silicon removal rate was 50.21%, a fluorine removal rate was 99.51%, and a purity of a finally obtained carbon was 95.75%, indicating that high-concentration acid is not beneficial to silicon removal and carbon purification.

Comparative Example 5

Compared with Example 1, the concentration of acid used in step (2) was 0.1 mol/L, and other conditions were kept unchanged; and after treatment of step (4), a silicon removal rate was 40.58%, a fluorine removal rate was 99.21%, and a purity of a finally obtained carbon was 95.21%. Acid with an excessively low concentration is not beneficial to silicon removal and as a result carbon purity is affected.

Comparative Example 6

Compared with Example 1, the acid leaching process in step (2) was performed at 90° C. under a normal pressure condition, and other conditions were kept unchanged; and after treatment of step (4), a silicon removal rate was 29.12%, a fluorine removal rate was 99.39%, and a purity of a finally obtained carbon was 94.96%, indicating that a low temperature and a low pressure are not beneficial to silicon removal and as a result carbon purity is affected.

Comparative Example 7

Compared with Example 1, the process of evaporation and concentration in step (3) was omitted, concentrated sulfuric acid was directly added to a slurry B for two stages of roasting; and other conditions were kept unchanged; and after treatment of step (4), a silicon removal rate was 49.87%, a fluorine removal rate was 80.53%, and a purity of a finally obtained carbon was 95.39%. It can be seen that the omission of the process of evaporation and concentration is not beneficial to silicon removal and as result the improvement of carbon purity was affected.

Comparative Example 8

Compared with Example 1, in step (3), a slurry B was evaporated and concentrated until a mass percentage of water was 15%, and other conditions were kept unchanged; and after treatment of step (4), a silicon removal rate was 80.32%, a fluorine removal rate was 90.31%; and a purity of a finally obtained carbon was 96.54%. It can be seen that excessive water in the slurry C is not beneficial to silicon removal and as result the improvement of carbon purity was affected.

Comparative Example 9

Compared with Example 1, the process of first-stage roasting in step (4) was omitted, second-stage roasting was directly performed, and other conditions were kept unchanged; and after treatment of step (4); a silicon removal rate was 5.21%, a fluorine removal rate was 10.51%, and a purity of a finally obtained carbon was 92.61%. It can be seen that the omission of the first-stage roasting is beneficial to neither silicon removal nor fluorine removal, making it difficult to improve carbon purity. In addition, redundant fluorine volatilizes in the stage of high-temperature calcination to severely corrode equipment.

Comparative Example 10

Compared with Example 1, the first-stage roasting temperature in step (4) was changed to 90° C., and other conditions were kept -unchanged; and after treatment of step (4), a silicon removal rate was 9.31%, a fluorine removal rate was 15.89%, and a purity of a finally obtained carbon was 92.93%. A low temperature is beneficial to neither silicon removal nor fluorine removal, making it difficult to improve carbon purity. In addition, redundant fluorine volatilizes in the stage of high-temperature calcination to severely corrode equipment.

Comparative Example 11

Compared with Example 1, the first-stage roasting time in step (4) was changed to 10 min; and other conditions were kept unchanged; and after treatment of step (4), a silicon removal rate was 11.23%, a fluorine removal rate was 30.21%, and a purity of a finally obtained carbon was 93.28%. It can be seen that an excessively short first-stage roasting time is beneficial to neither silicon removal nor fluorine removal, making it difficult to improve carbon purity. In addition, redundant fluorine volatilizes in the stage of high-temperature calcination to severely corrode equipment.

Comparative Example 12

Compared with Example 1, the process of second-stage roasting in step (4) was omitted, and the product in the first-stage roasting was directly used for high-temperature calcination; and after treatment of step (4), a silicon removal rate was 98.48%, a fluorine removal rate was 99.27%, and a purity of a finally obtained carbon was 97.59%. The omission of the second-stage roasting causes a large amount of sulfuric acid which can originally be removed at a low temperature to decompose and volatilize under a high-temperature condition, thereby generating a large amount of high-temperature sulfur-containing flue gas and increasing the burden on high-temperature flue gas treatment.

Comparative Example 13

Compared with Example 1, the mole ratio of F to S in step (4) was changed to 1:0.5, and other conditions were kept unchanged; and after treatment of step (4), a silicon removal rate was 30.98%, a fluorine removal rate was 50.45%, and a purity of a finally obtained carbon was 94.01%. An excessively small amount of acid is beneficial to neither silicon removal nor fluorine removal, making it difficult to improve carbon purity. In addition, redundant fluorine volatilizes in the stage of high-temperature calcination to severely corrode equipment.

Comparative Example 14

Compared with Example 1, the mole ratio of F to S in step (4) was changed to 1:7.0, and other conditions were kept unchanged; and after treatment of step (4), a silicon removal rate was 98.91%, a fluorine removal rate was 99.63%, and a purity of a finally obtained carbon was 97.58%, indicating that an excessively large amount of acid cannot improve carbon purity.

Comparative Example 15

Compared with Example 1, the high-temperature calcination time of in step (5) was changed to 1 h, and other conditions were kept unchanged; and after treatment of step (4), a silicon removal rate was 98.79%, a fluorine removal rate was 99.53%, and a purity of a finally obtained carbon was 95.94%, indicating that an excessively short calcination time is not beneficial for effective volatilization and removal of ash in the roasted carbon and as a result carbon purity is affected.

Example 5

(1) Spent carbon cathode were crushed and sieved, to obtain carbon particles.

(2) A sulfuric acid solution was added with Si in the carbon particles and S in the sulfuric acid solution as targets to make a mole ratio of Si to S in a slurry A be 1:2.10, where a concentration of the sulfuric acid solution was 3 mol/L, an immersion time was 5 h, a temperature was 150° C., and the pressure was 0.4 MPa. A gas generated in the process was absorbed using the alkaline solution.

(3) A slurry B was evaporated and concentrated at 120° C., and generated steam was collected, to obtain a slurry C, where a mass percentage of water in the obtained slurry C was 8%.

(4) Concentrated sulfuric acid was added with F in the slurry C and S in the concentrated sulfuric acid and the slurry C as targets to make a mole ratio of F to S in a slurry D be 1:1.0, where a concentration of the concentrated sulfuric acid was 18.4 mol/L. Then, roasting was performed at 150° C. for 5 h, which was first-stage roasting. Fluorine in flue gas generated in the process is absorbed and recycled by aluminum oxide using a dry process. Then, roasting was performed at 350° C. for 3 h, which was second-stage roasting, to obtain the roasted carbon. Flue gas generated was recycled.

(5) The roasted carbon was mixed with a leaching agent by a ratio of 1 g:1 mL for leaching, where the leaching agent was a mixed solution of water and a pH regulator M being sulfuric acid, a leaching temperature was 70° C., and a leaching time was 1 h. In the leaching process, a pH regulator N being sulfuric acid was added to regulate a pH value, to obtain a slurry E with a pH value of 2. The slurry E was filtered and washed to obtain a neutral filter cake and a filtrate. The filtrate was used as a raw material for recycling aluminum and sodium salts, and the filter cake was dried to obtain a carbon material with a purity of 98.52%.

Example 6

(1) Spent carbon cathode were crushed and sieved, to obtain carbon particles.

(2) A sulfuric acid solution was added with Si in the carbon particles and S in the sulfuric acid solution as targets to make a mole ratio of Si to S in a slurry A be 1:2.15, where a concentration of the sulfuric acid solution was 2 mol/L, an immersion time was 3 h, a temperature was 200° C., and the pressure was 1.6 MPa. A gas generated in the process was absorbed using the alkaline solution.

(3) A slurry B was evaporated and concentrated at 160° C., and generated steam was collected, to obtain a slurry C, where a mass percentage of water in the obtained slurry C was 7%.

(4) Concentrated sulfuric acid was added with F in the slurry C and S in the concentrated sulfuric acid and the slurry C as targets to make a mole ratio of F to S in a slurry D be 1:2.0, where a concentration of the concentrated sulfuric acid was 18 mol/L. Then, roasting was performed at 200° C. for 3 h, which was first-stage roasting. Fluorine in flue gas generated in the process is absorbed and recycled by aluminum oxide using a dry process. Then, roasting was performed at 450° C. for 2 h, which was second-stage roasting, to obtain the roasted carbon. Flue gas generated was recycled.

(5) The roasted carbon was mixed with a leaching agent by a ratio of 1 g:2 mL for leaching, where the leaching agent was water, a leaching temperature was 25° C., and a leaching time was 2 h. In the leaching process, a pH value was regulated, to obtain a slurry E with a pH value of 4. The slurry E was filtered and washed to obtain a neutral filter cake and a filtrate. The filtrate was used as a raw material for recycling aluminum and sodium salts, and the filter cake was dried to obtain a carbon material with a purity of 96.69%.

Example 7

(1) Spent carbon cathode were crushed and sieved, to obtain carbon particles.

(2) A sulfuric acid solution was added with Si in the carbon particles and S in the sulfuric acid solution as targets to make a mole ratio of Si to S in a slurry A be 1:2.20, where a concentration of the sulfuric acid solution was 1 mol/L, an immersion time was 1 h, a temperature was 250° C., and the pressure was 4 MPa. A gas generated in the process was absorbed using the alkaline solution.

(3) A slurry B was evaporated and concentrated at 180° C., and generated steam was collected, to obtain a slurry C, where a mass percentage of water in the obtained slurry C was 6%.

(4) Concentrated sulfuric acid was added with F in the slurry C and S in the concentrated sulfuric acid and the slurry C as targets to make a mole ratio of F to S in a slurry D be 1:3.0, where a concentration of the concentrated sulfuric acid was 17 mol/L. Then, roasting was performed at 250° C. for 1 h, which was first-stage roasting. Fluorine in flue gas generated in the process is absorbed and recycled by aluminum oxide using a dry process. Then, roasting was performed at 500° C. for 1 h, which was second-stage roasting, to obtain the roasted carbon. Flue gas generated was recycled.

(5) The roasted carbon was mixed with a leaching agent by a ratio of 1 g:3 mL, for leaching, where the leaching agent was a mixed solution of water and a pH regulator M being sodium hydroxide, a leaching temperature was 100° C., and a leaching time was 3 h. In the leaching process, a pH regulator N being sodium hydroxide was added to regulate a pH value, to obtain a slurry E with a pH value of 14. The slurry E was filtered and washed to obtain a neutral filter cake and a filtrate. The filtrate was used as a raw material for recycling aluminum and sodium salts, and the filter cake was dried to obtain a carbon material with a purity of 97.31%.

Example 8

(1) Spent carbon cathode were crushed and sieved, to obtain carbon particles.

(2) A sulfuric acid solution was added with Si in the carbon particles and S in the sulfuric acid solution as targets to make a mole ratio of Si to S in a slurry A be 1:2.25, where a concentration of the sulfuric acid solution was 3 mol/L, an immersion time was 1 h, a temperature was 150° C., and the pressure was 0.4 MPa. A gas generated in the process was absorbed using the alkaline solution.

(3) A slurry B was evaporated and concentrated at 120° C., and generated steam was collected, to obtain a slurry C, where a mass percentage of water in the obtained slurry C was 8%.

(4) Concentrated sulfuric acid was added with F in the slurry C and S in the concentrated sulfuric acid and the slurry C as targets to make a mole ratio of F to S in a slurry D be 1:3.5, where a concentration of the concentrated sulfuric acid was 18.4 mol/L. Then, roasting was performed at 150° C. for 5 h, which was first-stage roasting. Fluorine in flue gas generated in the process is absorbed and recycled by aluminum oxide using a dry process. Then, roasting was performed at 350° C. for 3 h, which was second-stage roasting, to obtain the roasted carbon. Flue gas generated was recycled.

(5) The roasted carbon was mixed with a leaching agent by a ratio of 1 g:1 mL for leaching, where the leaching agent was a mixed solution of water and pH regulators M being sulfuric acid and hydrochloric acid, a leaching temperature was 70° C., and a leaching time was 1 h. In the leaching process, pH regulators N being sulfuric acid and hydrochloric acid were added to regulate a pH value, to obtain a slurry E with a pH value of 1. The slurry E was filtered and washed to obtain a neutral filter cake and a filtrate. The filtrate was used as a raw material for recycling aluminum and sodium salts, and the filter cake was dried to obtain a carbon material with a purity of 98.72%.

Example 9

(1) Spent carbon cathode were crushed and sieved, to obtain carbon particles.

(2) A sulfuric acid solution was added with Si in the carbon particles and S in the sulfuric acid solution as targets to make a mole ratio of Si to S in a slurry A be 1:2.30, where a concentration of the sulfuric acid solution was 1 mol/L, an immersion time was 1 h, a temperature was 250° C., and the pressure was 4 MPa. A gas generated in the process was absorbed using the alkaline solution.

(3) A slurry B was evaporated and concentrated at 180° C., and generated steam was collected, to obtain a slurry C, where a mass percentage of water in the obtained slurry C was 6%.

(4) Concentrated sulfuric acid was added with F in the slurry C and S in the concentrated sulfuric acid and the slurry C as targets to make a mole ratio of F to S in a slurry D be 1:4.0, where a concentration of the concentrated sulfuric acid was 17 mol/L. Then, roasting was performed at 250° C. for 1 h, which was first-stage roasting. Fluorine in flue gas generated in the process is absorbed and recycled by aluminum oxide using a dry process. Then, roasting was performed at 500° C. for 1 h, which was second-stage roasting, to obtain the roasted carbon. Flue gas generated was recycled.

(5) The roasted carbon was mixed with a leaching agent by a ratio of 1 g:3 mL for leaching, where the leaching agent was water, a leaching temperature was 100° C., and a leaching time was 3 h. In the leaching process, a pH value was regulated, to obtain a slurry E with a pH value of 9. The slurry E was filtered and washed to obtain a neutral filter cake and a filtrate. The filtrate was used as a raw material for recycling aluminum and sodium salts, and the filter cake was dried to obtain a carbon material with a purity of 97.19%.

Example 10

(1) Spent carbon cathode were crushed and sieved, to obtain carbon particles.

(2) A sulfuric acid solution was added with Si in the carbon particles and S in the sulfuric acid solution as targets to make a mole ratio of Si to S in a slurry A be 1:2.05, where a concentration of the sulfuric acid solution was 1 mol/L, an immersion time was 1 h, a temperature was 250° C., and the pressure was 4 MPa. A gas generated in the process was absorbed using the alkaline solution.

(3) A slurry B was evaporated and concentrated at 180° C., and generated steam was collected, to obtain a slurry C, where a mass percentage of water in the obtained slurry C was 6%.

(4) Concentrated sulfuric acid was added with F in the slurry C and S in the concentrated sulfuric acid and the slurry C as targets to make a mole ratio of F to S in a slurry D be 1:4.5, where a concentration of the concentrated sulfuric acid was 17 mol/L. Then, roasting was performed at 250° C. for 1 h, which was first-stage roasting. Fluorine in flue gas generated in the process is absorbed and recycled by aluminum oxide using a dry process. Then, roasting was performed at 500° C. for 1 h, which was second-stage roasting, to obtain the roasted carbon. Flue gas generated was recycled.

(5) The roasted carbon was mixed with a leaching agent by a ratio of 1 g:3 mL for leaching, where the leaching agent was a mixed solution of water and a pH regulator M being sodium carbonate, a leaching temperature was 100° C. and a leaching time was 3 h. In the leaching process, a pH regulator N being sodium carbonate was added to regulate a pH value, to obtain a slurry E with a pH value of 12. The slurry E was filtered and washed to obtain a neutral filter cake and a filtrate. The filtrate was used as a raw material for recycling aluminum and sodium salts, and the filter cake was dried to obtain a carbon material with a purity of 97.32%.

Example 11

(1) Spent carbon cathode were crushed and sieved, to obtain carbon particles.

(2) A sulfuric acid solution was added with Si in the carbon particles and S in the sulfuric acid solution as targets to make a mole ratio of Si to S in a slurry A be 1:2.80, where a concentration of the sulfuric acid solution was 1 mol/L, an immersion time was 1 h, a temperature was 250° C., and the pressure was 4 MPa. A gas generated in the process was absorbed using the alkaline solution.

(3) A slurry B was evaporated and concentrated at 180° C., and generated steam was collected, to obtain a slurry C, where a mass percentage of water in the obtained slurry C was 6%.

(4) Concentrated sulfuric acid was added with F in the slurry C and S in the concentrated sulfuric acid and the slurry C as targets to make a mole ratio of F to S in a slurry D be 1:2.5, where a concentration of the concentrated sulfuric acid was 17 mol/L. Then, roasting was performed at 250° C. for 1 h, which was first-stage roasting. Fluorine in flue gas generated in the process is absorbed and recycled by aluminum oxide using a dry process. Then, roasting was performed at 500° C. for 1 h, which was second-stage roasting, to obtain the roasted carbon. Flue gas generated was recycled.

(5) The roasted carbon was mixed with a leaching agent by a ratio of 1 g:3 mL for leaching, where the leaching agent was a mixed solution of water and pH regulators M being sodium bicarbonate and sodium hydroxide, a leaching temperature was 100° C., and a leaching time was 3 h. In the leaching process, pH regulators N being sodium bicarbonate and sodium hydroxide were added to regulate a pH value, to obtain a slurry E with a pH value of 13. The slurry E was filtered and washed to obtain a neutral filter cake and a filtrate. The filtrate was used as a raw material for recycling aluminum and sodium salts, and the filter cake was dried to obtain a carbon material with a purity of 97.54%.

Comparative Example 16

Compared with Example 5, the acid leaching in step (2) and the corresponding step of evaporation and concentration were omitted, concentrated sulfuric acid was directly added for roasting, and other conditions were kept unchanged; and after treatment of step (4), a silicon removal rate was 10.18%, a fluorine removal rate was 99.48%, and a purity of a finally obtained carbon was 92.64%. It can be seen that deep purification of carbon materials is difficult to realize if phase transition was not performed on silicon dioxide and silicate in spent carbon cathode in advance.

Comparative Example 17

Compared with Example 5, the sulfuric acid solution was added in step (2) to make the mole ratio of Si to S in the slurry A be 1:1, and other conditions were kept unchanged; and after treatment of step (4), a silicon removal rate was 20.21%, a fluorine removal rate was 99.50%, and a purity of a finally obtained carbon was 93.73%, indicating that the addition of an excessively small amount of acid is not beneficial to a leaching process and as a result carbon purity is affected.

Comparative Example 18

Compared with Example 5, after adding a sulfuric acid solution in step (2), a mole ratio of Si to S in a slurry A was made 1:5, and other conditions remained unchanged; and after treatment of step (4), a silicon removal rate was 98.96%, and a fluorine removal rate was 99.47%; and a purity of a finally obtained carbon was 98.49%. It can be seen that the addition of excessive acid cannot improve the carbon purity, but increases the burden on evaporation and concentration in step (3).

Comparative Example 19

Compared with Example 5, the concentration of acid used in step (2) was 10 mol/L, and other conditions were kept unchanged; and after treatment of step (4), a silicon removal rate was 50.21%, a fluorine removal rate was 99.51%, and a purity of a finally obtained carbon was 94.64%, indicating that high-concentration acid is not beneficial to carbon purification.

Comparative Example 20

Compared with Example 5, the concentration of acid used in step (2) was 0.1 mol/L, and other conditions were kept unchanged; and after treatment of step (4), a silicon removal rate was 40.58%, a fluorine removal rate was 99.21%, and a purity of a finally obtained carbon was 94.19%. Acid with an excessively low concentration is not beneficial to a leaching process and as a result carbon purity is affected.

Comparative Example 21

Compared with Example 5, the acid leaching process in step (2) was performed at 90° C. under a normal pressure condition, and other conditions were kept unchanged; and after treatment of step (4), a silicon removal rate was 29.12%, and a fluorine removal rate was 99.39%, and a purity of a finally obtained carbon was 93.87%, indicating that a low temperature and a low pressure are not beneficial to a leaching process and as a result carbon purity is affected.

Comparative Example 22

Compared with Example 5, the process of evaporation and concentration in step (3) was omitted, concentrated sulfuric acid was directly added to a slurry B for two stages of roasting, and other conditions were kept unchanged; and after treatment of step (4), a silicon removal rate was 49.87%, a fluorine removal rate was 80.53%, and a purity of a finally obtained carbon was 94.58%. It can be seen that the omission of the process of evaporation and concentration is not beneficial to the improvement of carbon purity.

Comparative Example 23

Compared with Example 5, in step (3), a slurry B was evaporated and concentrated until a mass percentage of water was 15%, and other conditions were kept unchanged; and after treatment of step (4), a silicon removal rate was 80.32%, a fluorine removal rate was 90.31%, and a purity of a finally obtained carbon was 95.62%. it can be seen that excessive water in the slurry C is not beneficial to the improvement of carbon purity.

Comparative Example 24

Compared with Example 5, the process of first-stage roasting in step (4) was omitted, second-stage roasting was directly performed, and other conditions were kept unchanged; and after treatment of step (4), a silicon removal rate was 5.21%, a fluorine removal rate was 10.51%, and a purity of a finally obtained carbon was 91.76%. It can be seen that the omission of the first-stage roasting is not beneficial to the improvement of carbon purity.

Comparative Example 25

Compared with Example 5, the first-stage roasting temperature in step (4) was changed to 90° C., and other conditions were kept -unchanged; and after treatment of step (4), a silicon removal rate was 9.31%, a fluorine removal rate was 15.89%, and a purity of a finally obtained carbon was 92.28%. A low temperature is not beneficial to fluorine volatilization and silicon removal and as a result carbon purity is affected. In addition, remaining fluoride largely volatilizes in the stage of high-temperature calcination to severely corrode equipment.

Comparative Example 26

Compared with Example 5, the first-stage roasting time in step (4) was changed to 10 min, and other conditions were kept unchanged; and after treatment of step (4), a silicon removal rate was 11.23%, a fluorine removal rate was 30.21%, and a purity of a finally obtained carbon was 92.96%. It can be seen that an excessively short first-stage roasting time is not beneficial to the improvement of carbon purity.

Comparative Example 27

Compared with Example 5, the mole ratio of F to S in step (4) was changed to 1:0.5, and other conditions were kept unchanged; and after treatment of step (4), a silicon removal rate was 30.98%, a fluorine removal rate was 50.45%, and a purity of a finally obtained carbon was 93.09%. An excessively small amount of acid is beneficial to neither silicon removal nor fluorine removal. As a result, carbon purity is affected, and high-temperature fluorine-containing flue gas is generated in the stage of high-temperature calcination to severely corrode equipment.

Comparative Example 28

Compared with Example 5, the mole ratio of to S in step (4) was changed to 1:7.0, and other conditions were kept unchanged; and after treatment of step (4), a silicon removal rate was 98.91%, a fluorine removal rate was 99.63%, and a purity of a finally obtained carbon was 98.49%, indicating that an excessively large amount of acid cannot improve carbon purity.

Comparative Example 29

Compared with Example 5, the roasted carbon in step (5) was mixed with a sulfuric acid solution by a ratio of 1 g:15 mL, and other conditions were kept unchanged; and after treatment of step (4), a silicon removal rate was 99.13%, a fluorine removal rate was 98.27%, and a purity of a finally obtained carbon was 98.49%, indicating that the addition of an excessive leaching agent cannot improve the purity of carbon materials.

Comparative Example 30

Compared with Example 9, a pH value of the slurry E obtained in step (5) was 7; and after treatment of step (4), a silicon removal rate was 99.53%, a fluorine removal rate was 98.12%, and a purity of a finally obtained carbon was 87.32%; indicating that inappropriate control over a pH value in the leaching process is not beneficial to carbon purification.

The foregoing descriptions are some exemplary implementations of the present invention. It should be noted that a person of ordinary skill in the art may make some improvements and modifications without departing from the principle of the present invention and the improvements and modifications shall fall within the protection scope of the present invention.

What is claimed is:
1. A method for recycling spent carbon cathode of aluminum electrolysis, comprising the following steps:
   1) mixing spent carbon cathode particles with a sulfuric acid solution to obtain a first slurry, and performing leaching to obtain a second slurry, wherein a concentration of the sulfuric acid solution is 0.5-8 mol/L;
   2) evaporating and concentrating the second slurry to obtain a third slurry;
   3) adding concentrated sulfuric acid to the third slurry to obtain a fourth slurry;
   4) performing first-stage roasting on the fourth slurry at 150-300° C., and then performing second-stage roasting at 300-600° C. to obtain roasted carbon; and
   5) performing calcination on the roasted carbon to obtain purified carbon.
2. The method according to claim 1, wherein
   the concentration of the sulfuric acid solution is 1-3 mol/L, and
   in the first slurry, by a mole ratio, Si:S=1:(2.05-3.0).
3. The method according to claim 1, wherein
   the leaching is pressure leaching, wherein a leaching temperature is 100-300° C., a leaching time is 1-10 h, and a leaching pressure is 0.1-9 MPa.
4. The method according to claim 1, wherein
   the second slurry is evaporated and concentrated at 100-200° C. to obtain the third slurry.
5. The method according to claim 1, wherein in the third slurry, a mass fraction of water is <8%.
6. The method according to claim 1, wherein
   a concentration of the concentrated sulfuric acid is 17-18.4 mol/L, and
   in the fourth slurry, by a mole ratio, F:S=1:(0.5-5).
7. The method according to claim 1, wherein
   a temperature of the first-stage roasting is 150-250° C., and a time of the first-stage roasting is 0.5-10 h; and
   a temperature of the second-stage roasting is 350-500° C., and a time of the second-stage roasting is 0.5-8 h.
8. The method according to claim 1, wherein
   steam generated in the process of evaporating and concentrating the second slurry is recycled, flue gas generated in the second-stage roasting is absorbed using the steam recycled in the process of evaporating and concentrating the second slurry, and an acid solution formed after absorption is used to prepare the sulfuric acid solution to be returned for the leaching of the spent carbon cathode particles, and
   fluorine in flue gas generated in the first-stage roasting is absorbed and recycled by aluminum oxide using a dry process.
9. The method according to claim 1, wherein in step 5, a calcination temperature is 1200-3000° C., and a calcination time is 0.5-20 h; and
   the calcination is performed in an inert atmosphere, a reducing atmosphere, or an atmosphere with an oxygen partial pressure less than 1000 Pa.

10. The method according to claim 1, wherein
when the roasted carbon is calcined at 1200-2200° C. for 4-10 h to obtain the purified carbon, and the obtained purified carbon is a carbon material with a purity greater than 97.5%, and
when the roasted carbon is calcined at 2200-3000° C. for 4-7 h to obtain the purified carbon, and the obtained purified carbon is a graphite powder with a purity greater than 99%.

11. A method for recycling spent carbon cathode of aluminum electrolysis, comprising the following steps:
1) mixing spent carbon cathode particles with a sulfuric acid solution to obtain a first slurry, and performing first leaching to obtain a second slurry, wherein a concentration of the sulfuric acid solution is 0.5-8 mol/L;
2) evaporating and concentrating the second slurry to obtain a third slurry;
3) adding concentrated sulfuric acid to the third slurry to obtain a fourth slurry;
4) performing first-stage roasting on the fourth slurry at 150-300° C., and then performing second-stage roasting at 300-600° C. to obtain roasted carbon;
5) mixing the roasted carbon with a leaching agent to perform second leaching, wherein the leaching agent is water or a mixed solution of water and a first pH regulator;
6) adding a second pH regulator in the second leaching to control a pH value of a fifth slurry obtained at an end of the second leaching to be less than 6 or greater than 8; and
7) performing solid-liquid separation to obtain a solid phase, and drying the solid phase to obtain a carbon material.

12. The method according to claim 11, wherein
the concentration of the sulfuric acid solution is 1-3 mol/L, and
in the first slurry, by a mole ratio, Si:S=1:(2.05-3.0).

13. The method according to claim 11, wherein
the first leaching is pressure leaching, wherein a temperature of the first leaching is 100-300° C., a time of the first leaching is 1-10 h, and a pressure of the first leaching is 0.1-9 MPa.

14. The method according to claim 11, wherein
the second slurry is evaporated and concentrated at 100-200° C. to obtain the third slurry, and in the third slurry, a mass fraction of water is <8%.

15. The method according to claim 11, wherein
concentration of the concentrated sulfuric acid is 17-18.4 mol/L, and
in the fourth slurry, by a mole ratio, F:S=1:(0.5-5).

16. The method according to claim 11, wherein
a temperature of the first-stage roasting is 150-250° C., and a time of the first-stage roasting is 0.5-10 h; and
a temperature of the second-stage roasting is 350-500° C., and a time of the second-stage roasting is 0.5-8 h.

17. The method according to claim 11, wherein
steam generated in the process of evaporating and concentrating the second slurry is recycled, flue gas generated in the second-stage roasting is absorbed using the steam recycled in the process of evaporating and concentrating the second slurry, and an acid solution formed after absorption is used to prepare the sulfuric acid solution to be returned for the first leaching of the spent carbon cathode particles, and
fluorine in flue gas generated in the first-stage roasting is absorbed and recycled by aluminum oxide using a dry process.

18. The method according to claim 11, wherein
a solid-liquid mass volume ratio of the roasted carbon to the leaching agent is 1 g:(0.5-10) mL,
a temperature of the second leaching is 10-300° C., and a time of the second leaching is 0.5-10 h.

19. The method according to claim 11, wherein
the first pH regulator and the second pH regulator are both at least one selected from the group consisting of sulfuric acid, hydrochloric acid, nitric acid, sodium hydroxide, potassium hydroxide, sodium carbonate, potassium carbonate, sodium bicarbonate, and potassium bicarbonate.

20. The method according to claim 11, wherein
the fifth slurry is filtered and washed to obtain a neutral filter cake and a filtrate,
the neutral filter cake is dried to obtain the carbon material, and
the filtrate is used as a raw material for recycling aluminum, sodium, and sulfate.

* * * * *